July 13, 1926.
H. A. HAMILTON ET AL
1,592,764
KNOCKDOWN TRELLIS
Filed Nov. 18, 1925
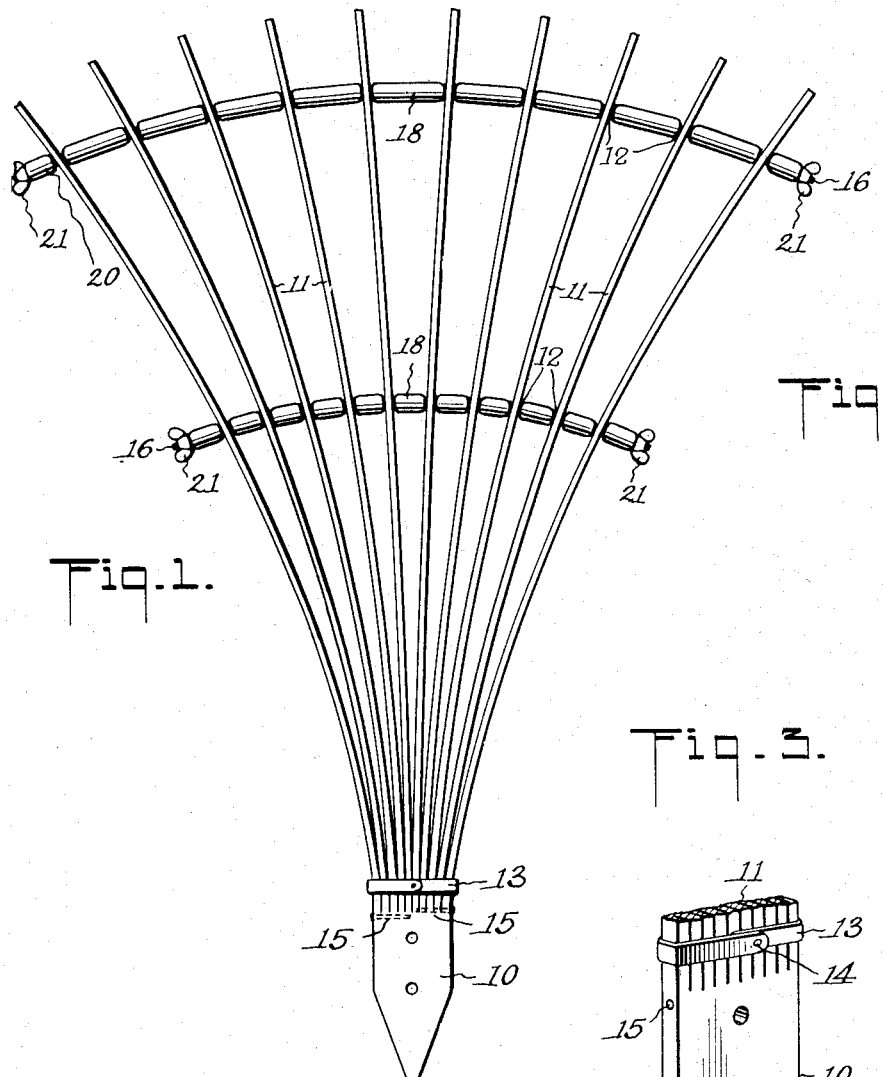
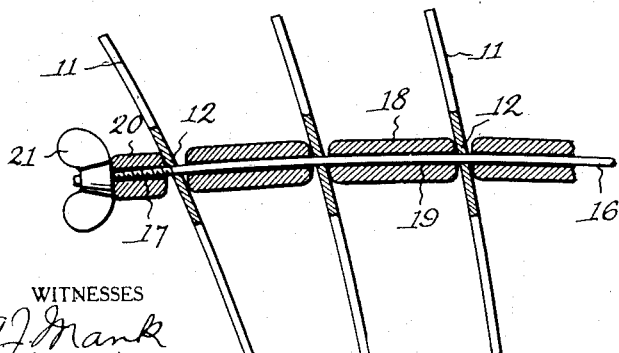
WITNESSES
INVENTORS
HENRY A. HAMILTON
DENNIS J. ENRIGHT
BY
ATTORNEYS Patented July 13, 1926.

1,592,764

UNITED STATES PATENT OFFICE.

HENRY A. HAMILTON AND DENNIS J. ENRIGHT, OF JERSEY CITY, NEW JERSEY.

KNOCKDOWN TRELLIS.

Application filed November 18, 1925. Serial No. 69,824.

This invention relates to a trellis and has especial reference to a knock-down or collapsible trellis.

The principal object of the present invention is to improve the type of trellis which is adapted for garden use in conjunction with plants and flowers, which is capable of being spread out in a fancy fan-like shape to support plants and flowers, and which is capable of being knocked down or collapsed to allow the same to be readily packed for carrying and shipment.

The nature of the invention and its distinguishing features and advantages will appear when the following specification is read in conjunction with the accompanying drawing, in which:—

Figure 1 is an elevation showing the trellis of the present invention spread out in fan-like condition ready for use.

Fig. 2 is a view illustrating the knocked down or collapsed condition of the trellis with the parts detached and made ready for shipment.

Fig. 3 is a perspective view of the stake member, portions of the flexible members and the means for limiting the spread of the flexible members.

Fig. 4 is an enlarged sectional elevation showing the manner in which the flexible members of the trellis are maintained in spaced relationship.

Referring now more particularly to the several views of the drawing, it will be apparent that, in accordance with the present invention use is made of a single piece of material, preferably of wood, which is so cut as to provide a pointed stake member 10, and a plurality of members 11 each of which is capable of being flexed due to the inherent flexibility of the material used. The members 11 are substantially equal in length and each is provided with two holes 12 spaced from each other a suitable distance.

In order to limit the outward flex of several of the outer members 11 at each side of the trellis there is provided a metalic strip 13 which is made to encircle the members 11 at the juncture of said members with the stake member 10. The opposite ends of the strip 13 are brought together, and a suitable fastener 14 is employed to hold the ends together. Nails or the like 15 are also employed, there being one driven into each side of the stake member 10 slightly below the strip 13 to prevent cracking or breaking of the stake member while the strip 13 prevents the separation of the members 11 from the stake member 10.

In order to maintain the flexible members in a spaced relationship, as shown in Fig. 1 of the drawing, there are provided flexible elements 16 each of which is provided with screw threads 17 at each of its ends. The said elements 16 are of different lengths, the longer element being extended through the upper series of holes 12 in the members 11, whereas, the shorter element 16 is extended in the lower series of holes 12 in the members 11. As each of the elements 16 has one of its ends passed through the hole in each of the members 11 a spacer 18 having a bore 19 is held in place so that the end of the element 16 will pass through the spacer 18. Thus a spacer 18 will occur between each pair of adjacent flexible members 11, and in order to hold the parts in place the opposite protruding ends of each of the elements 16 are provided with comparatively short spacers 20, and a wing nut 21 is threaded on to the screw threaded extremity 17. The opposite ends of the spacers are rounded to readily adjust themselves when arranged between the members 11. It is to be noted that when the members 11 are spread out the alignment of the upper and lower series of holes 12 will be an arced alignment and, therefore, it is necessary to make use of flexible elements such as the elements 16 each of which can be made to assume an arced condition and thus be extened through the series of holes 12. By employing the elements 16, spacers 18 and 20, and wing nuts 21 which constitute the means for maintaining the flexible members 11 in spaced relationship in the manner disclosed, the members 11 will be effectively prevented from flexing back to a collapsed condition. Were it not for the fact that the elements 16 extend through portions of the members 11 with means at each end of each element 16 for preventing the same from having longitudinal movement, the said members 11 due to warping would become free and move back to a collapsed condition, as has been experienced where notched members have been used to maintain the flexible members in spaced relationship. Other means for holding the flexible members in spaced or spread out relationship have been employed, which have been found to be difficult to apply.

From the foregoing description, and from the drawing it will be apparent that there has been disclosed a trellis having structural features which improve the same and make it readily capable of being spread out for use and collapsed or knocked down for shipment.

What we claim is:—

1. A knock-down trellis comprising a plurality of flexible members extending from a pointed stake member and capable of being spread out in spaced relationship, each of said flexible members having a hole therein, and means for maintaining the flexible members in the spaced relationship, said means comprising a flexible element which extends through the holes in said flexible members and spacers surrounding said flexible element and arranged respectively between said flexible members, and retaining devices at each end of said flexible element.

2. A knock-down trellis comprising a plurality of flexible members extending from a pointed stake member and capable of being spread out in spaced relationship, each of said flexible members having a hole therein, and means for maintaining the flexible members in the spaced relationship, said means comprising a flexible element which extends through the holes in said flexible members and spacers surrounding said flexible element and arranged respectively between said flexible members, retaining devices at each end of said flexible element, and means for limiting the outward flex of said flexible members.

3. A knock-down trellis comprising a plurality of flexible members extending from a pointed stake member and capable of being spread out in spaced relationship, each of said flexible members having a hole therein, and means for maintaining the flexible members in the spaced relationship, said means comprising a flexible element which extends through the holes in said flexible members and spacers surrounding said flexible element and arranged respectively between said flexible members, said flexible element having screw threaded ends, and a nut adapted to be screwed on each of said ends.

4. A knock-down trellis comprising a plurality of flexible members extending from a pointed stake member and capable of being spread out in spaced relationship, each of said flexible members having spaced holes therein, and means for maintaining the flexible members in the spaced relationship, said means comprising flexible elements each of which extends through certain holes respectively in said flexible members, spacers surrounding each of said flexible elements and arranged respectively between said flexible members, each of said flexible elements having screw threaded ends, and nuts adapted to be screwed on the screw threaded ends respectively of each of said flexible elements.

DENNIS J. ENRIGHT.
HENRY A. HAMILTON.